J. HERZOG.
WARPED PANEL AND METHOD OF FORMING SAME.
APPLICATION FILED JULY 8, 1918.
1,343,320.
Patented June 15, 1920.
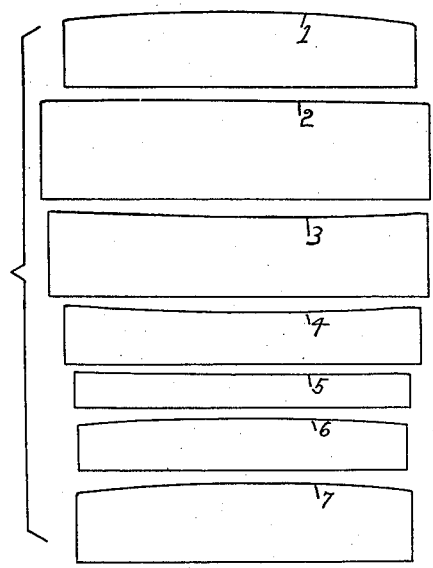
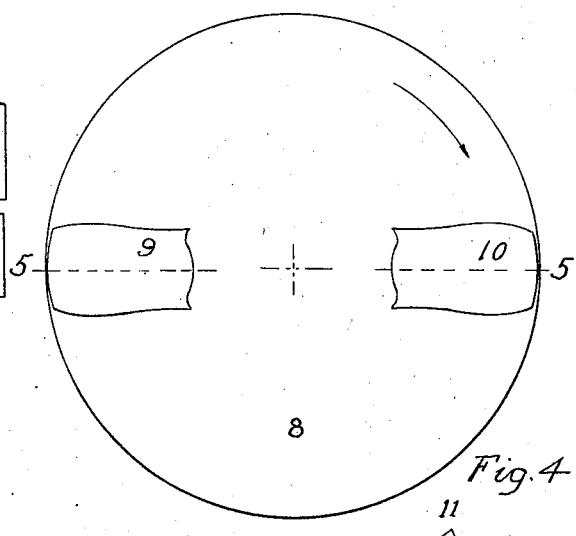
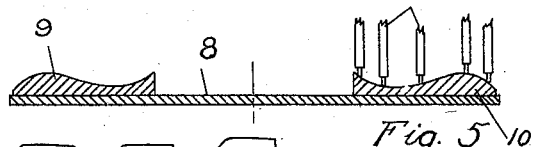
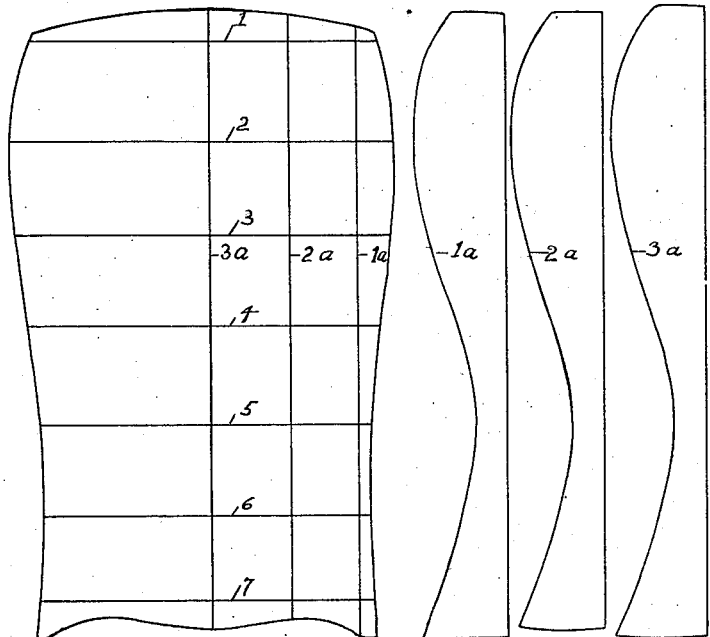
INVENTOR.
BY
ATTORNEY

UNITED STATES PATENT OFFICE.

JOHN HERZOG, OF SAGINAW, MICHIGAN.

WARPED PANEL AND METHOD OF FORMING SAME.

1,343,320.　　　　　Specification of Letters Patent.　　Patented June 15, 1920.

Application filed July 8, 1918. Serial No. 243,950.

*To all whom it may concern:*

Be it known that I, JOHN HERZOG, a citizen of the United States, residing at Saginaw, in the county of Saginaw and State of Michigan, have invented certain new and useful Improvements in Warped Panels and Methods of Forming Same; and I do hereby declare the following to be a full, clear, and exact description of the invention, such as will enable others skilled in the art to which it appertains to make and use the same.

This invention relates to the manufacture of panels and pertains more particularly to an improved method of making wooden panels, such for example as the sides of phonograph cabinets and the like.

The improved method is more particularly adapted to the shaping of the panel surface so that the said surface will show an artistic and pleasing form. Panels of such form usually have bowed or warped surfaces to relieve the effect of rigidity which the cabinet would have if the sides were perfectly flat.

The best artistic effect is produced when the surface of the panel is warped both in longitudinal direction and transversely, so that parts of the surface are slightly bumped or bulged outwardly and other parts are slightly dished inwardly.

The amount of bulge or dish given to the surface is usually slight to produce the best artistic effect in the finished cabinet, but unless it is present to some extent the value of the artistic effect of the cabinet is reduced.

It is, therefore, the object of my present invention to provide a simple and effective method for forming the warped surfaces of panels so that the surface will be warped both longitudinally and transversely, that is to say, bulged in some places and dished in other places.

In following out my method I mount one or more panel blanks on the flat face of a large revoluble disk, the panel being located away from the center of the disk so that the panel as a whole revolves around the center of rotation of the disk. The disk is then revolved at a suitable cutting speed and the panel is faced off by means of a turning tool, the cutting edge of which is presented to the face of the panel as it revolves, as in ordinary face-plate turning operations.

While the tool is being moved transversely along the face of the panel so as to cut the entire surface, it is also moved toward and away from the plane of the disk, so as to produce a wavy or warped contour on the surface of the panel.

Panels formed by this method, in which the panel as a whole is revolved, have surfaces that are warped, that is, bulged and dished, not only lengthwise but they are also warped crosswise, so that some parts of the surface of the panel are slightly concave and others slightly convex. Usually there are not more than, say, two or three places in the surface of a well designed panel that include straight lines as elements of the surfaces. With a few exceptions, any line taken in any direction in the surface of the panel will be a curved line, whereas if the panel were formed by sawing, as in a band saw, the transverse lines of the surface would all be straight lines.

In the accompanying drawings, Figure 1 is a front view of a panel formed according to my improved method, the straight lines of the surface of the panel indicating lines along which the panel has been cut for the purpose of showing the contour of the surface in the plane indicated by those lines.

Fig. 2 is a diagrammatic view showing the contour of the panel surface at different distances from the center line of the panel outward toward the side edge.

Fig. 3 are successive contours taken in planes across the panel.

Fig. 4 is a diagrammatic face view of the disk on which the panels are mounted.

Fig. 5 is a horizontal section on the line 5—5 of Fig. 4.

As is clearly shown in the drawings, the panels are formed by mounting them on the face of the disk, revolving the disk so the panels travel at a proper cutting speed and then forming the faces of the panels by means of a cutting tool, preferably in the manner described in my co-pending application Serial No. 243949.

Numerals 1 to 7 in Figs. 1 and 3 show the successive transverse contours at different heights along the panel. Numerals $1^a$ to $3^a$ inclusive show successive contours at different distances out from the center of the panel. 8 represents the revolving disk and 9 and 10 are two panels mounted thereon.

11 represents a series of cutting tools, by which the outer face of the panel is formed.

The curvatures of the panel contours have been exaggerated in the drawing, for purpose of better illustration. They are, however, exact reproductions of sections of a small model panel formed by the method herein described.

Referring to the successive transverse sections on the lines 1 to 7 inclusive, as shown in Fig. 3, it will be noted that contour 1 is convex; 2 is practically straight; 3 is concave; 4 is still more concave; 5 is practically straight; and 6 and 7 are increasingly concave.

Referring to Fig. 2 showing the contours of longitudinal sections, the warping of the surfaces in the longitudinal direction at different distances from the center line of the panel is clearly illustrated.

In the drawings I have shown only the front surface of the panel blank as having been formed by my improved method, but it is obvious that the reverse face may be formed in the same manner by turning the panel over and mounting it on the disk 8 with its shaped face next the disk and then facing off the reverse surface of the panel in the manner above described. It is further obvious that the reverse face of the panel may be formed with exactly the same contour as the front face, so that a number of panels can be piled together and their respective front and back surfaces will exactly fit together. Hence my improved method makes it possible to form the front and reverse surfaces exactly alike. This produces a panel that varies somewhat in thickness in its different parts. It is an important advantage in the manufacture of cabinets that when a number of such panels have been faced with veneer they can be piled together and subjected to heavy pressure, as in a hydraulic press, thereby firmly and uniformly gluing the veneer to the face of the panel without any danger of crushing or cracking either the veneer or the panels, because every part of the rear surface of the warped panel is uniformly supported by the front surface of the adjacent panel.

Panels with front and back surfaces exactly alike are to be distinguished from panels formed by bending or bulging flat panel blanks of uniform thickness in a forming press. Such method would produce a panel of uniform thickness, but the inner and outer surfaces would not be of the same shape. Consequently it would not be possible to nest such panels and subject them to the necessary pressure for veneering purposes, since the load would be unevenly distributed over the panel surface, and the panels would break.

With my improved method, however, I am enabled to produce panels of identical contours on their inside and outside faces and can thereby press them in a veneer press in large quantities and do the work both rapidly and accurately.

The artistic effect of panels produced as above described is due as previously stated, to their dished and bulged faces. These faces are parts of a surface of revolution, as it is evident from inspection of the diagrammatic Figs. 4 and 5. This surface of revolution may be conceived as being described by revolving a radial line that is curved throughout its length or that varies axially throughout its length. Any point on such a revolving line will describe a circle on the surface of revolution, and describes a circular arc on the panel itself, the length of the sagitta of the arc depending upon the width of the panel with respect to its distance radially from the center of revolution. In practice the width of the panel with respect to its distance out from the center of revolution is preferably such that a point on the line, as for example, a cutting tool in fixed position during a single revolution of the panel will describe an arc having a substantial sagitta. But because of the axial variation of the line of revolution its successive radial points do not necessarily lie in the same plane of revolution. Consequently a straight edge applied to the surface tangential to the elemental arcs as lines 1 to 7 in Fig. 1 will not generally fit the surface of the panel, but will disclose, as indicated at 1 to 7 in Fig. 3, a transversely warped or bowed surface.

By this means the desired artistic appearance of the panel is attained and rapid and economical production of bowed panels is made possible.

Having thus described my invention, what I claim and desire to secure by Letters Patent is:

1. A panel formed by generating a surface of revolution by revolving a line curved transversely to the plane of revolution about one of its ends.

2. A panel having a face thereof formed by generating a surface of revolution described by revolving a line curved transversely to the plane of revolution.

3. A panel having a face thereof formed by generating a surface of revolution described by revolving a line curved transversely to the plane of revolution and disposed substantially at right angles to the axis of rotation.

4. A panel comprising a substantially rectangular section cut from a surface of revolution that varies axially on a curved line throughout its radial length, said panel bounded by substantially tangential lines connected by lines substantially parallel to and on opposite sides of a radius.

5. A panel comprising a section of a surface of revolution defined by the revolution about one of its ends of a line curved transversely of its plane of revolution, said panel being bounded by substantially tangential lines connected by lines substantially parallel to and on opposite sides of a radius and spaced apart by a distance approximately equal to the distance of the inner tangential line from the center of rotation.

6. The herein described method of forming a panel with the face thereof warped both longitudinally and transversely, comprising revolving a panel about a center exterior to the panel, the width of the panel comprising such a chord of the circle of revolution that a tool in fixed position during a single revolution of the panel will describe an arc having a substantial sagitta, and cutting with a tool whereby to cut across the panel from edge to edge thereof in a circular arc, said tool and panel having relative radial movement and simultaneous movement toward and away from each other.

7. The herein described method of forming a panel having the face thereof warped both longitudinally and transversely, comprising revolving a panel about a center exterior to the panel, the face of the panel lying substantially in the plane of revolution of the panel, the width of the panel comprising such a chord of the circle of revolution that a tool in fixed position during a single revolution of the panel will describe an arc having a substantial sagitta, and cutting with a tool whereby to cut across the panel from edge to edge thereof in a circular arc, said tool and panel having relative radial movement and simultaneous movement toward and away from each other.

8. A panel having both its front and back faces formed by generating a surface of revolution described by revolving a line curved transversely to the plane of revolution, whereby both faces of the panel are of identical contour, for the purposes set forth.

In testimony whereof I affix my signature.

JOHN HERZOG.